United States Patent [19]
Wildey

[11] 4,221,245
[45] Sep. 9, 1980

[54] TREE HARVESTER WITH SAW AND SHEAR

[75] Inventor: Allan J. Wildey, Brantford, Canada

[73] Assignee: Koehring Canada Limited, Brantford, Canada

[21] Appl. No.: 4,812

[22] Filed: Jan. 19, 1979

[51] Int. Cl.² .......................................... A01G 23/08
[52] U.S. Cl. ............................. 144/34 R; 144/34 E
[58] Field of Search ............... 144/3 D, 34 R, 34 E, 144/309 AC

[56] References Cited
U.S. PATENT DOCUMENTS

| | | | |
|---|---|---|---|
| 3,610,301 | 10/1971 | Jordan | 144/34 E |
| 3,796,242 | 3/1974 | Abright | 144/34 R |
| 3,875,983 | 4/1975 | Kurelek | 144/34 R |
| 3,976,111 | 8/1976 | Jonsson | 144/34 R |
| 4,116,250 | 9/1978 | Ericsson | 144/34 R |

FOREIGN PATENT DOCUMENTS

| | | | |
|---|---|---|---|
| 142106 | 3/1961 | U.S.S.R. | 144/34 R |
| 599768 | 11/1975 | U.S.S.R. | 144/34 R |
| 496993 | 12/1975 | U.S.S.R. | 144/34 E |

*Primary Examiner*—W. Donald Bray
*Attorney, Agent, or Firm*—Sim & McBurney

[57] ABSTRACT

Tree cutting equipment that may constitute a part of the head of a tree harvester includes a saw assembly and a shear assembly, the shear and saw being movable towards each other, preferably in substantially the same plane. A stop associated with the shear assembly and engageable with the saw assembly limits the extent to which the saw can approach the shear so as to prevent the saw from attempting to cut completely through the trunk of a tree located between the shear and saw. The stop is located on the side of the pivot point for the saw that is remote from the shear, and a window is provided in the arm that supports the shear to permit the ejection of saw chips.

12 Claims, 7 Drawing Figures

TREE HARVESTER WITH SAW AND SHEAR

BACKGROUND OF THE INVENTION

This invention relates to tree cutting equipment of a type that may be incorporated into the tree cutting and grasping head of a tree harvester.

Tree cutting equipment for use with a tree harvester where the cutting implement is a shear or a chain saw is well known. It also is known to incorporate both a shear and a chain saw into the same head.

In U.S. Pat. No. 3,976,111, issued Aug. 24, 1976, B. Jonsson there is disclosed a tree cutting device employing both a shear and a chain saw. The shear is mounted at and travels at an acute angle to the kerf made by the saw. In operation, the trunk of a tree is partly cut by the chain saw. The chain saw then is backed out through the saw kerf and the shear is activated to complete the cut. Because of the way in which the shear is inclined, it alone could not be used to cut through the trunk of the tree.

Similar tree cutting equipment is shown in U.S. Pat. No. 3,610,301, issued Oct. 5, 1951, B. L. Jordan. In this case the chain saw and shear move in the same plane, but the degree of movement of the shear is such that it alone could not be used to cut completely through the trunk of the tree. Also this equipment suffers from the disadvantage that the operator must control the depth of the cut made by the chain saw. If the cut is made too deep, the saw may bind making it impossible to withdraw the saw through the saw kerf.

In U.S. Pat. No. 3,796,242, issued Mar. 12, 1974, A. Albright there is disclosed tree cutting equipment including a shear and a chain saw. The cutting implements operate independently of each other depending on tree size, the chain saw being used to cut through large diameter tree trunks and the shears being used with smaller diameter tree trunks. They are not used together in the cutting down of any tree.

In the case of trees which are to be used for lumber, it is desirable that no splitting of the end of the trunk take place when the tree is cut. This requirement dictates that a chain saw should be used. Likewise, in the case of trees having large diameter trunks, say, 8" and over, a chain saw may have to be used. However, with smaller diameter trunks, and where splitting is not a consideration, as in the case of trees slated for use in the pulp and paper industry, it is faster and more economical to cut using a shear.

In accordance with the instant invention there is provided tree cutting equipment employing both a saw and shear. The components are so arranged that the shear alone may be used for cutting through the trunks of certain types of trees, while both the saw and shear are used for cutting through the trunks of other types of trees.

BRIEF SUMMARY OF THE INVENTION

In accordance with one aspect of this invention there is provided tree cutting equipment comprising a saw assembly including a saw, a pivotable tree trunk shear blade assembly including a shear blade, means for rotating said saw assembly during the cutting of a tree about a pivot point toward said shear blade assembly, means for driving said saw in the same direction as said saw rotates about said pivot point, means for pivoting said shear blade assembly toward said saw blade assembly, and stop means carried by said shear blade assembly and engageable with said saw assembly to limit the extent to which said saw assembly can move relative to said shear blade assembly such that said saw can cut only part-way through a tree trunk located between said saw and said shear blade before engaging said stop means, said shear blade being located on one side of said pivot point, said stop means being located on the opposite side of said pivot point.

BRIEF DESCRIPTION OF THE DRAWINGS

This invention will become more apparent from the following detailed description, taken in conjunction with the appended drawings, in which.

DETAILED DESCRIPTION OF THE INVENTION INCLUDING THE PREFERRED EMBODIMENT

Figure 1:
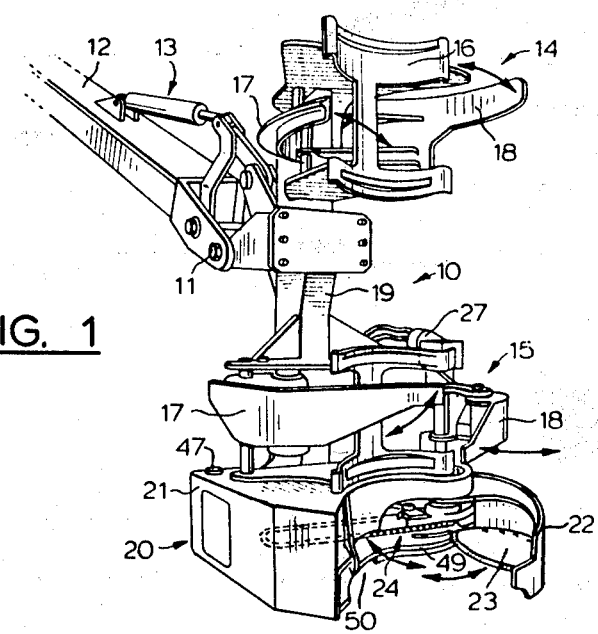
FIG. 1 is a perspective view of the head of a tree harvester, such head incorporating apparatus embodying the instant invention.

Referring to FIG. 1, there is shown the head 10 of a tree harvester (not shown). Head 10 is pivotably mounted at 11 on the articulated knuckle boom 12 of the tree harvester and can be pivoted about a horizontal axis by means of a hydraulically operated piston, cylinder and connecting rod assembly 13. The head is provided with two sets of spaced apart tree gripping mechanisms 14 and 15 each consisting of a backup plate 16 and hydraulically operated arms 17 and 18 that pivot about vertical axes and, in their closed position, cooperate with backup plates 16 to grasp the trunk of a tree firmly therebetween.

The components of head 10 described in the preceding paragraph are conventional in nature. Further details thereof together with additional details of boom 12 and the tree harvester itself may be obtained from U.S. Pat. No. 3,875,983, John Kurelek, issued Apr. 8, 1978. The disclosure of this patent is incorporated herein by reference.

Secured to the main frame member 19 of head 10 at the bottom of head 10 is a tree cutting assembly 20 embodying the instant invention. This assembly includes a housing 21, a yoke or arm 22 pivotably mounted about a vertical axis and carrying a shear blade 23, a saw 24 also pivotably mounted about the same vertical axis as arm 22, a drive mechanism for saw 24 and means for pivoting arm 22 and saw 24. Saw 24 preferably is a chain saw, as shown.

Figure 6:
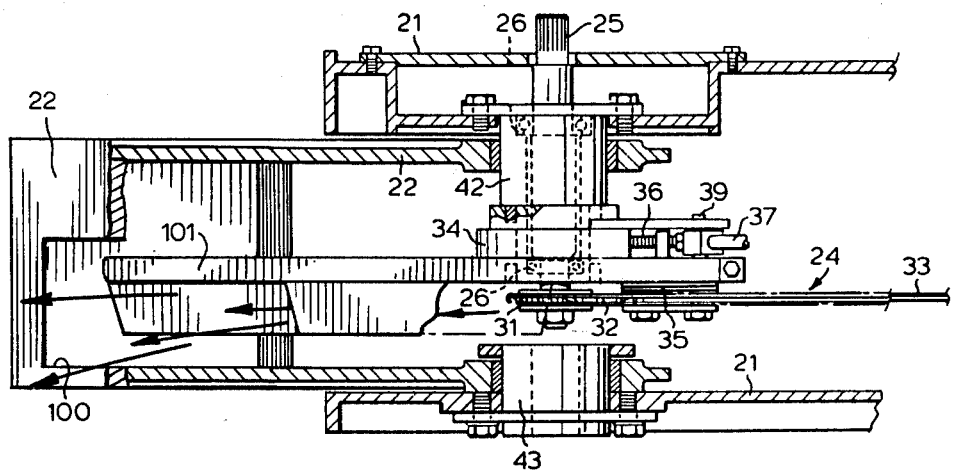
FIG. 6 is a section taken along line 6—6 in FIG. 3.

As best seen in FIG. 6, a vertical shaft 25 journalled in bearings 26 is driven by a hydraulic motor 27 (FIG. 1) via a universal joint 28 (FIG. 2) having on one side a shaft 29 (FIG. 2) that is driven by the motor and on the other side a shaft 30 (FIG. 2) that is splined or otherwise secured to shaft 25. Of course, a power source other than a hydraulic motor can be used if desired.

As best shown in FIG. 6, secured to shaft 25 at the lower end thereof is a sprocket 31 that drives the chain 32 of chain saw 24 over the chain bar 33 of the chain saw.

Figure 2:
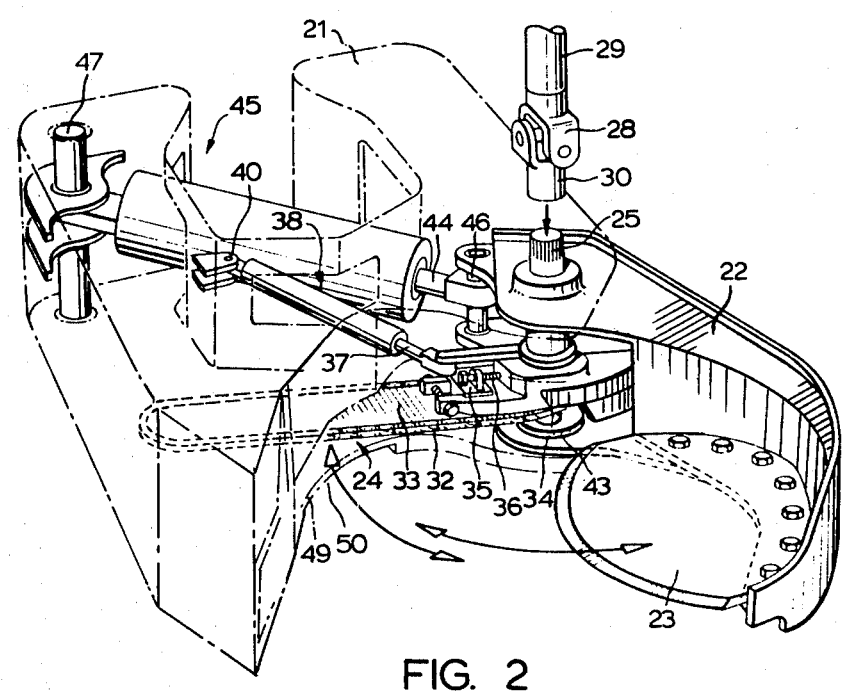
FIG. 2 is a perspective view of tree cutting equipment embodying the instant invention shown in greater detail than in FIG. 1.

Referring to FIGS. 2 and 6, a saw swivel bushing 34 constituting a part of the chain saw is rotatably mounted on shaft 25 above sprocket 31. Bushing 34 is bolted or otherwise fastened to chain bar 33, the bolts being secured to a block 35. The position of block 35 can be adjusted by an adjusting block 36 to move chain bar 33 relative to sprocket 31 and thus adjust the tension in chain 32.

As shown in FIGS. 2, 3, 5 and 6, the connecting rod 37 of a hydraulically operated piston, cylinder and connecting rod assembly 38 is pivotably connected to bushing 34 at 39, the cylinder of this assembly being pivotably connected to housing 21 at 40.

Any suitable mechanism can be employed for oiling chain 32.

As best shown in FIG. 6, a shear yoke bushing 42 is rotatably mounted on shaft 25 above saw swivel bushing 34. A second shear yoke bushing 43 aligned with bushing 42 is rotatably mounted in housing 21. Shear arm or yoke 22 is secured to bushings 42 and 43.

Referring to FIGS. 2, 3, 5 and 6, the connecting rod 44 of a hydraulically operated piston, cylinder and connecting rod assembly 45 is pivotably connected to yoke 22 at 46, the cylinder of this assembly being pivotably connected to housing 21 at 47.

As may be seen in FIGS. 1, 2, 3 and 5, and in accordance with an important aspect of the instant invention, carried by yoke 22 is a stop 48. Stop 48, being carried by yoke 22, is movable with yoke 22 when the latter is pivoted about shaft 25. In the illustrated embodiment of the invention stop 48 is in the form of an angle iron secured to yoke 22. It is so located that it is engageable with the chain saw, i.e., with an extension of saw swivel bushing 34, as will become more apparent hereinafter.

Although stop 48 could be located on the same side of the axis about which shear 23 and saw 24 pivot as shear 23 is located, in contrast, and in accordance with an aspect of the instant invention, stop 48 is located on the opposite side of the axis (shaft 25) about which shear 23 and saw 24 pivot to the side on which shear 23 is located. Since the saw chain runs in a counterclockwise direction when viewed from above, as in FIG. 3, saw chips tend to accumulate adjacent the side of shear 23 that is next to shaft 25. With the stop located in this same position, the accumulation of saw chips in this location tends to cause movement of the saw toward the shear to be stopped prematurely. This problem is overcome by relocation of stop 48. In addition, in order to assist in solving this problem, a window 100 has been provided in yoke 22 opposite saw 24. Saw chips can exit through the window.

It will be noted that actual engagement between saw 24 and stop 48 is effected by means of an extension arm 101 formed integral with bushing 34 and extending in a direction opposite to the direction in which chain bar 33 extends. This extension arm forms a sweeper that continuously cleans saw chips out of window 100. Also it will be noted that the area of window 100 available for saw chip ejection increases as the cut being made by saw 24 proceeds.

Figure 3:
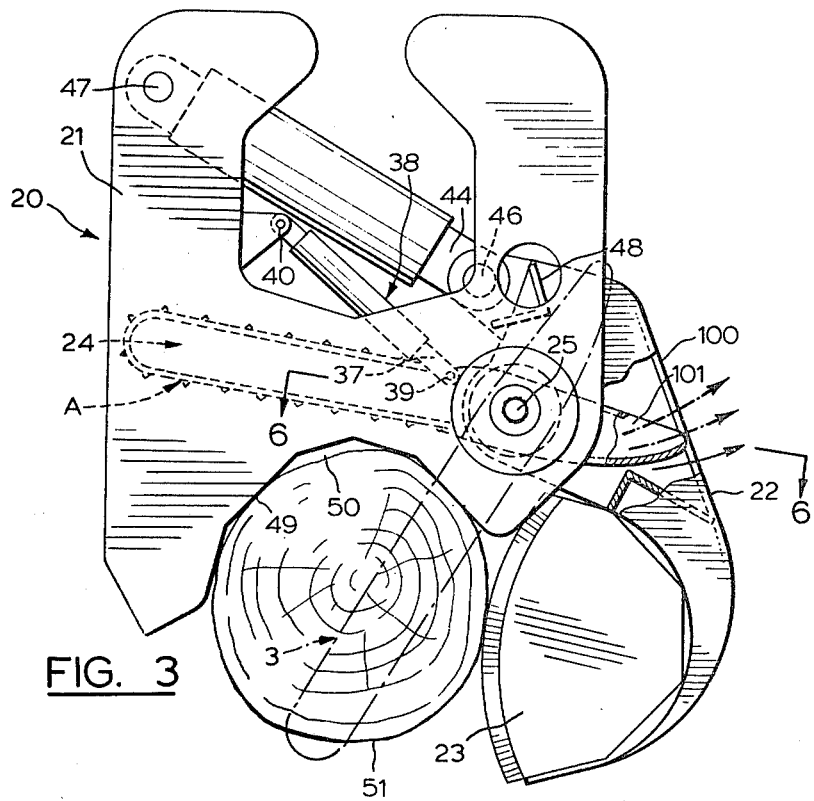
FIG. 3 is a top elevation of the tree cutting equipment shown in FIG. 2.
Figure 7:
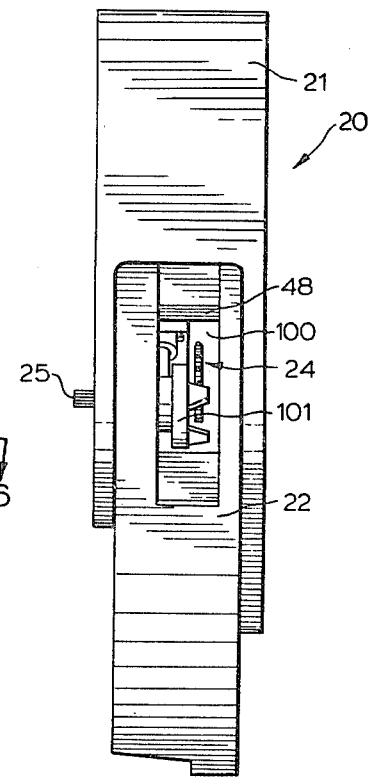
FIG. 7 (second sheet of drawings) is a side view of the apparatus shown in FIG. 3.

It also is significant that extension arm 101 is visible through window 100 and, to this end the outer tip of extension arm 101 preferably is designed so as to be about flush with window 100, as shown in FIG. 3. The location of extension arm 101 is visible to the operator, at least in summer, and enables the operator to determine the location of saw 24, which is particularly desirable during operator training.

As may be seen by reference to FIGS. 1, 2, 3 and 5, the leading edge 49 of housing 21 is formed with a tree-trunk receiving indentation 50.

Figure 5:
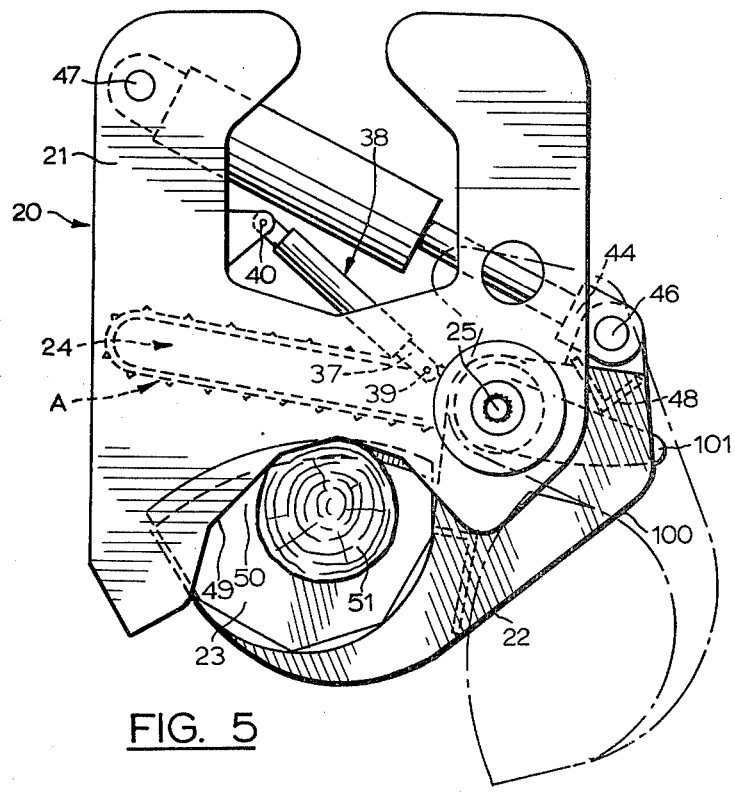
FIG. 5 is a view like FIG. 3 showing certain of the components of the equipment in different positions than in FIG. 3.
Figure 4:
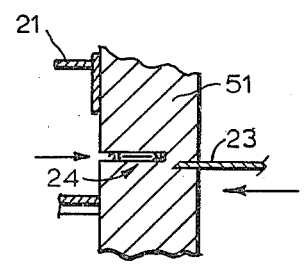
FIG. 4 is a section through a tree and a part of the equipment shown in FIG. 3 illustrating the relative position of the saw and shear.

In operation, when it is desired to cut down a tree, the trunk of which is shown at 51 in FIGS. 3, 4 and 5, head 10 is moved relative to the tree until the tree is located in indentation 50 abutting against leading edge 49 of housing 21, as shown in FIGS. 3 and 5. Tree gripping arms 17 and 18 then are pivoted inwardly to firmly secure head 10 to the trunk of the tree.

If the tree is a tree of relatively small diameter, say, about 8" or less, and is to be used in the pulp and paper industry rather than for lumber, the tree may be cut simply using shear 23. To this end, yoke 22 carrying shear 23 is pivoted about shaft 25 by means of piston, cylinder and connecting rod assembly 45, shear 23 moving into engagement with the trunk of the tree, as shown in FIG. 3, and then completely through the trunk of the tree, as seen in FIG. 5.

On the other hand, if the tree has a trunk which is larger than the maximum diameter trunk that can be cut by shear 23 alone, or if the tree is to be used for lumber, so that the cut end should not be split in any way, chain saw 24 followed by shear 23 are used for the cutting operation. In this case shear 23 is moved to the position shown in FIG. 3 in which, for location purposes, the trunk of the tree is indented by shear 23. This prevents inadvertent vertical movement of head 10 during the sawing operation. If this were not done, the saw blade could bind or become damaged as a result of operator misjudgement or the strain relieving that is inherent in the clamping and cutting process. Chain saw 24 driven by motor 27 then is pivoted about shaft 25 by means of piston, cylinder and connecting rod assembly 38 from the position A shown in FIG. 3 to position B shown in FIG. 3. During this movement a substantial portion of the trunk of the tree is cut by the chain saw with the saw chips being ejected through window 100. However, the chain saw is prevented from cutting completely through trunk 51 by virtue of the abutment of extension arm 101 agaist stop 48 when chain saw 24 is in position B. In this manner it is ensured that a part of the trunk of the tree remains intact to support the weight of the tree and permit the chain saw to be withdrawn through the saw kerf without binding. Generally speaking, in the case of a trunk of 8" diameter, at least about 1" of wood (measured at the deepest part of the segment) should be left after the saw cutting operation. In the case of a trunk of 24" diameter, at least about 2" of wood should be left. After the withdrawal operation has been completed, shear 23 is activated to complete the cut, the shear moving from the position shown in FIG. 3 through the trunk of the tree to the position shown in solid outline in FIG. 5, or to the position where the shear meets the saw kerf. As is best seen in FIG. 4, in the preferred embodiment chain saw 24 and shear 23 lie in substantially the same plane, so there is no problem of the cuts made by the shear and chain saw not meeting each other. Preferably shear 23 cuts about 1" below saw 24. This has been found to produce less splitting and to result in a less hazardous stump than is the case where the shear cut slightly above the saw.

As best shown in FIGS. 3 and 5, stop 48 is V-shaped in configuration. This is desirable in order to prevent ice, snow and debris from building up on the stop, as might occur if it were in the form of a flat plate, for example. With stop 48 being V-shaped, it functions somewhat like a plow when ice, snow etc. is forced against it by extension arm 101 as it moves toward stop 48.

The instant invention is particularly useful when used with a multiple stem head of the type disclosed in aforementioned U.S. Pat. No. 3,875,983. In this respect, the facility to accumulate multiple trees is best offered with an arrangement of components where the shear blade swings inwardly, as in the case of the instant invention. Also it is best to have an inward swinging shear blade when the blade is expected to sever whole trees since a good, positive reaction to the shearing forces is possible under these circumstances.

While a preferred embodiment of this invention has been described herein, those skilled in the art will appreciate that changes and modifications may be made without departing from the spirit and scope of this invention as defined in the appended claims.

What is claimed is:

1. Tree cutting equipment comprising a saw assembly including a saw, a pivotable tree trunk shear blade assembly including a shear blade, means for rotating said saw assembly during the cutting of a tree about a pivot point toward said shear blade assembly, means for driving said saw in the same direction as said saw assembly rotates about said pivot point during the cutting of a tree, means for pivoting said shear blade assembly toward said saw assembly, and stop means carried by said shear blade assembly and engageable with said saw assembly to limit the extent to which said saw assembly can move relative to said shear blade assembly such that said saw can cut only part-way through a tree trunk located between said saw and said shear blade before engaging said stop means, said shear blade being located on one side of said pivot, said stop means being located on the opposite side of said pivot point.

2. Tree cutting equipment according to claim 1 wherein said shear blade assembly includes a shear blade supporting arm, said arm having an opening therein located opposite said saw assembly providing an opening through which saw chips cut by said saw assembly exit.

3. Tree cutting equipment according to claim 2 wherein said saw assembly includes an arm that engages said stop means, said arm sweeping in close proximity to said opening during movement of said saw assembly about said pivot point and assisting in removing saw chips accumulated in proximity to said opening.

4. Tree cutting equipment according to claim 3 wherein said saw is a chain saw.

5. Tree cutting equipment according to claim 4 wherein said arm is located on one side of said pivot point and said chain saw is located on the opposite side of said pivot point.

6. Tree cutting equipment according to claim 3 wherein said saw and said shear blade are arranged to move in substantially the same plane with said shear blade being slightly lower than said saw.

7. Tree cutting equipment according to claim 5 including a housing having an indented front edge against which a tree trunk to be cut is abutted, said shear blade assembly being pivoted on said housing and said shear blade during cutting by said shear blade being movable towards the tree trunk and through the tree trunk towards said front edge, said chain saw being pivoted on said housing and during cutting by said chain saw being movable towards the tree trunk and said shear blade and through the tree trunk and away from said front edge.

8. Tree cutting equipment according to claim 7 wherein said chain saw normally is located within said housing but is movable outwardly thereof when cutting through a tree trunk.

9. Tree cutting equipment according to claim 5 wherein said means for driving said chain saw includes a shaft, said shaft serving as a pivot point for both said chain saw and said arm.

10. Tree cutting equipment according to claim 5 wherein said means for pivoting said shear blade assembly and said chain saw comprise independent hydraulically operated cylinder, piston and connecting rod assemblies.

11. Tree cutting equipment according to claim 1 wherein said stop means is generally V-shaped in configuration.

12. Tree cutting equipment according to any one of claims 1, 2 or 3 wherein said shear blade assembly also pivots about said pivot point.

* * * * *